(12) United States Patent
Claffey (10) Patent No.: US 9,314,695 B2
(45) Date of Patent: Apr. 19, 2016

(54) ELECTRONIC TABLETOP VIRTUAL SPORTS GAMING SYSTEM

(71) Applicant: Brian Claffey, Colleyville, TX (US)

(72) Inventor: Brian Claffey, Colleyville, TX (US)

( * ) Notice: Subject to any disclaimer, the term of this patent is extended or adjusted under 35 U.S.C. 154(b) by 110 days.

(21) Appl. No.: 14/164,135

(22) Filed: Jan. 25, 2014

(65) Prior Publication Data

US 2014/0213357 A1   Jul. 31, 2014

Related U.S. Application Data

(60) Provisional application No. 61/756,811, filed on Jan. 25, 2013.

(51) Int. Cl.
  *A63F 9/24* (2006.01)
  *A63F 13/00* (2014.01)
  *A63F 13/214* (2014.01)
  *A63F 13/65* (2014.01)
  *A63F 7/06* (2006.01)

(52) U.S. Cl.
  CPC ............. *A63F 13/214* (2014.09); *A63F 7/0668* (2013.01); *A63F 13/65* (2014.09); *A63F 2009/2442* (2013.01); *A63F 2009/2457* (2013.01); *A63F 2009/2488* (2013.01); *A63F 2250/18* (2013.01)

(58) Field of Classification Search
  CPC . A63F 13/214; A63F 13/2145; A63F 13/215; A63F 13/217; A63F 2300/1068; A63F 2300/1075; A63F 2300/1087; A63F 2300/1093; A63F 7/0668; A63F 13/65; A63F 2250/18; A63F 2009/2488; A63F 2009/2442; A63F 2009/2457
  See application file for complete search history.

(56) References Cited

U.S. PATENT DOCUMENTS

| | | | | |
|---|---|---|---|---|
| 4,733,867 A | * | 3/1988 | Kemp | A63F 7/0668 273/108.5 |
| 4,872,679 A | * | 10/1989 | Bohaski | A63F 7/0668 273/108 |
| 5,257,783 A | * | 11/1993 | Callaghan | A63F 7/40 273/317.5 |
| 5,673,912 A | * | 10/1997 | Bonk | A63F 7/40 273/108.4 |
| 5,714,972 A | | 2/1998 | Tanaka | |
| 5,853,327 A | * | 12/1998 | Gilboa | 463/39 |
| 6,422,942 B1 | | 7/2002 | Jeffway, Jr. | |
| 6,690,156 B1 | * | 2/2004 | Weiner et al. | 324/207.17 |
| 6,761,634 B1 | * | 7/2004 | Peterson et al. | 463/30 |
| 7,315,793 B2 | | 1/2008 | Jean | |

(Continued)

FOREIGN PATENT DOCUMENTS

WO  WO2004079671 A2  9/2004
WO  WO2006061393 A2  6/2006

OTHER PUBLICATIONS

Steven Scher, et al., Making Real Games Virtual: Tracking Board Game Pieces, ICPR 2008 19th International Conference on Pattern Recognition, Dec. 8-11, 2008, Tampa, FL, USA.

(Continued)

*Primary Examiner* — Milap Shah
(74) *Attorney, Agent, or Firm* — Braxton, Hilton & Perrone, PLLC (57) ABSTRACT

A virtual gaming environment including processing systems and methods and generally includes operations related to visual display of movements and locations of physical game pieces and storage and retrieval of data in accordance with various game events. The game system can comprise a game token, a display, a mobile device, a processor, and combinations thereof.

20 Claims, 8 Drawing Sheets

(56) References Cited

U.S. PATENT DOCUMENTS

| | | |
|---|---|---|
| 7,397,464 B1 | 7/2008 | Robbins |
| 7,474,983 B2 * | 1/2009 | Mazalek et al. ............... 702/150 |
| 7,900,921 B1 * | 3/2011 | Palmer et al. ............. 273/126 A |
| 7,902,840 B2 | 3/2011 | Zachut |
| 8,123,614 B2 | 2/2012 | Kulas |
| 8,272,945 B2 | 9/2012 | Kelly |
| 8,292,733 B2 * | 10/2012 | Crawford et al. ................ 463/31 |
| 8,342,925 B2 * | 1/2013 | Martin et al. ...................... 463/2 |
| 8,540,569 B2 * | 9/2013 | Orlinsky et al. ................. 463/30 |
| 8,602,857 B2 * | 12/2013 | Morichau-Beauchant et al. .................................. 463/6 |
| 8,616,971 B2 * | 12/2013 | Lundback et al. .............. 463/31 |
| 2003/0103217 A1 * | 6/2003 | Gombert ........................ 356/614 |
| 2005/0288078 A1 | 12/2005 | Cheok |
| 2007/0184886 A1 | 8/2007 | Floden |
| 2008/0116643 A1 * | 5/2008 | Miranda ............... A63F 7/0058 273/317.5 |
| 2010/0248839 A1 | 9/2010 | Davis |
| 2011/0195763 A1 | 8/2011 | Kang |
| 2011/0216002 A1 | 9/2011 | Weising |
| 2011/0250967 A1 | 10/2011 | Kulas |
| 2011/0312420 A1 | 12/2011 | Portin |
| 2012/0056717 A1 | 3/2012 | Maharbiz |
| 2012/0190453 A1 | 7/2012 | Skaff |
| 2012/0295684 A1 | 11/2012 | Richter |
| 2013/0032997 A1 * | 2/2013 | Kolb ..................... A63F 3/0052 273/108.4 |

OTHER PUBLICATIONS

Albert Krohn, et al., Enhancing Tabletop Games With Relative Positioning Technology, University of Karlsruhe, Karlsruhe, Germany, 2004.

* cited by examiner

ELECTRONIC TABLETOP VIRTUAL SPORTS GAMING SYSTEM

This application claims priority to provisional patent application No. 61/756,811 filed Jan. 25, 2013, which is incorporated in its entirety by reference.

FIELD OF THE DISCLOSURE

The present disclosure generally relates to a wireless virtual gaming environment including processing systems and methods and generally includes operations related to visual display of movements and locations of physical game pieces and storage and retrieval of data in accordance with various game events.

BACKGROUND

An electronic and computer based tabletop virtual sports gaming system is presented. The disclosed gaming system is an advancement based on the classic paper football game that many have enjoyed for decades. In the classic game, a football is constructed of a sheet of paper by making various folds in the paper. The paper is ultimately folded in a strip and then folded in a manner over itself to create (typically) an isosceles triangle of a thickness of roughly ¼ inch, with the long sides of the triangle roughly 1½ inches in length. In the two player game, each player sits or stands at opposite ends of an ordinary table, such as a kitchen table. In the game, one player slides the paper football to the opposite end of the table, towards the opposing end zone. The object is to slide the football in a manner in which the ball comes as close to the edge of the table end without falling off of the table. If the ball comes to rest with a corner of the ball hanging over the table edge, while the ball remains on the table, a touchdown is scored. At times, a player may choose to kick a field goal. In this operation, the kicking player holds the ball on the table upright and steadily by holding one corner with one finger and then flicking the ball with the other hand. At the same time, the player on the other end of the table constructs a makeshift field goal post from his fingers and thumbs. If the ball sails through the other player's goal post, the field goal is good. The players repeat this process until the game is complete.

With the advent of modern electronic gaming systems, popularity of the classic tabletop football has waned. The present electronic virtual tabletop sports gaming system, however, will make tabletop football popular again by enhancing the classic game with modern wireless and processing capabilities and the storing and retrieval of data according to game events.

SUMMARY OF THE DISCLOSURE

The present electronically enabled tabletop football incorporates electronic components and a chip enabling storage and playback of pre-recorded or newly recorded audio messages to be played upon scoring a touchdown. In one embodiment, the electrical components are housed within a soft yet durable triangular football structure of the size substantially similar to the ball employed in the classic game. The electronic game piece or ball includes a plurality of optoelectronic sensors. The sensors, which are placed at a distal end of each spoke of a triangular game piece senses motion of the game piece across the game surface. Situating multiple sensors on the lower face of the game piece allows sensing of the location of each spoke of the ball in relation to various boundaries of a playing field. In a football game, for example, the passage of the sensor across a football field goal line indicates that the spoke associated with one of the sensors broke the plane of the end zone and a touchdown is scored. However, if the sensor passes across the line denoting the back of the end zone, then the play is ruled out of bounds and no touchdown in awarded. Similarly, if a sensor crosses a sideline, then the play stops at the yard line on the field where the piece went out of bounds, and the game clock stops. Alternatively, if the three sensors come to rest within the end zone, the parameters of which are stored, then a touchdown is awarded.

With the occurrence of certain events in the game, various multimedia messages are retrieved from storage and played for the user. By example, where a touchdown is scored, archived video of a professional player of the team of the user's choosing scoring a touchdown is displayed and the teams fight song is played. By contrast, when a field goal is missed, video of a football sailing outside of the field goal uprights may be shown, followed by a dejected kicker and audio of boos from disgruntled fans. Virtually limitless combinations of multimedia messages may be played throughout the course of the game depending on circumstances, all to enhance the experience of the user.

The present electronic virtual gaming system is enabled for wireless communication between components, employing either a Bluetooth or WiFi protocol, or combinations thereof. This allows registration and tracking of game events in real time and permits play among remote players. In one embodiment, a ball is equipped with known optoelectronic sensors to permit tracking on an associated monitor of the position of the game piece on the game surface. A wireless interface housed in the game piece and a corresponding receiver connected to a port of a computer or tablet allow the game piece to communicate with the game processor.

The game piece, which is equipped with an input key, is used to designate the mode of play and plot and register playing field type and size. Once the game ball and field parameters among local players or between remote players are registered and synchronized, the events of the game and the movements of the ball throughout the field (plotted table) may be monitored, recorded and tracked. In one embodiment, a Bluetooth enabled tabletop ball is registered via wireless interface components residing in the ball and similar capability and applications residing in a mobile device, such as a smart phone, and/or laptop computer. The ball is then used to plot and store the corners of the field (table). This has the effect of identifying the location of the sidelines of the field and each end zone. An application that may be downloaded to a smartphone or similar wireless device, such as a tablet, provides all of the processing capability necessary to create a highly entertaining game that not only provides audio and video enhancements, but allows for storage of game statistics, team records and the like. The associated smart phone, laptop or tablet kept nearby on which an associated application is stored may receive this information and display a game score, favorite players or teams simulating the play, celebratory audio or video or any other desired multimedia effects.

In addition, a smart phone or other mobile device that has photography or video recording capability may serve as a sensor to determine if a field goal is made or missed. Synchronization of the smartphone with the laptop allows for real time recognition of successful or failed field goals and corresponding scoring and statistical updates.

In addition, statistics compiled during a single game may be accumulated and stored in a storage medium via wireless means. The statistics may be viewed over the Internet via a dedicated website on which players register their tabletop football team. Statistics may be compiled over time and teams may play a season schedule, much like professional football, culminating in a championship game. Like fantasy football, statistics may be compiled on a game by game basis and real professional players may be associated with a particular team. Points may be assigned to players for scoring touchdowns, kicking field goals, or gaining yards. Numerous players may join leagues and complete not only on the tabletop but over time as statistics are compiled.

The presently enabled tabletop football game may be modified for other sports such as soccer, hockey or basketball. The wireless functionality will operate in a similar manner to track scoring plays and other game events.

Throughout generations table games have been played to help occupy time and challenge those who wish to compete. Two such games that have been played are commonly known as paper football or penny soccer. The game of paper football has general rules and basic techniques in playing the game. Using any sort of rectangular table will set the field for you to play the game. Each side of the table will denote the sidelines and end zones similar to an American football field. In creating your football, any sort of paper will do, however, if the paper is light in weight it will allow the ball to fly through the air better when thumping to kick a field goal. The objective of the game is to thump and/or push a triangle or pyramid shaped paper football to where it hangs off the edge of the opposing team's edge of the table or end zone. In the event the paper football falls off any edge of the table, the ball is transferred or "turned-over" to the opposing team for them to now play. In the event a touchdown is scored or the paper football is hanging off the table's edge or table's end zone, you would receive six points similar to how American football is played. After scoring a touchdown you will then have the opportunity to flick the paper football from one end zone to the other with your index finger, all while your opponent creates a modified field goal using his or her thumbs and index fingers. In the event the paper football crosses the field goal, you would receive an additional point. There are many possible ways to play the game paper football which may include multiple thumps to including field goals which are all discretionary on how one wishes to play. Paper football is a great interactive game that can be played anytime and anywhere with anyone as long as you have an adequate surface and some paper to make the ball. Penny soccer is played in a very similar way but by sliding a penny, like some sort of ball or puck, across the table and trying to get it to slide between two other pennies serving as the goal post. Penny soccer may serve as the format for multiple games such as penny hockey, penny basketball etc., provided that the user has a goal to shoot the penny in, you have a game to play.

GPS Enabled Table Top Football Game

Incorporation of known Global Positioning System (GPS) technology, compass technology and accelerometers and associated components into a small and lightweight tabletop football and associated devices, as well as the ability to communicate with other processing and display devices via known wireless communication protocols, for use in the tabletop game is another advance in the classic paper football game. The game of paper football that provided enjoyment for generations has all but vanished because of its simplistic nature and its inability to keep up with 21st century gaming systems. Incorporation and implementation of motion tracking capability and techniques within circular, triangular or pyramid shaped object enable the game's events to be displayed and monitored and stored through wireless means. This brings a "paper football" into the $21^{st}$ century.

The presently disclosed electronic virtual gaming system also enables connectivity between remote players via the Internet. In this manner, players at different locations may play with different game pieces but on a common virtual playing surface that is plotted and stored according to the systems and methods described herein. This remote capability allows players to join leagues worldwide and compete and compare statistics among any number of participants.

Customization

The disclosed system also includes customizable settings that allow players to set the look and feel of the playing surface according to favorite professional or collegiate team colors, mascots or logos. Audio and/or video files stored on the gaming system are played and displayed to the users via an associated computer or mobile device in response to certain game actions. A long movement of a game piece that results in a touchdown will, for example, cause retrieval and playback of video of a favorite player catching a long touchdown pass. A missed field goal would cause retrieval and playback of video of a ball in flight that misses the field goal uprights. The audio that may accompany game events includes crowd noise, team fight songs, play-by-play commentary and the like. The combinations of available multimedia data that may be associated with various game events are numerous.

BRIEF DESCRIPTION OF THE DRAWINGS

FIG. 6 is a depiction of display of the virtual game surface of an embodiment of the disclosed electronic virtual gaming system.

DETAILED DESCRIPTION OF THE EMBODIMENTS

Before undertaking the detailed description below, it may be advantageous to set forth definitions of certain words and phrases used in connection to the disclosed exemplary embodiments: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the subject matter of this application has been described with reference to illustrative embodiments, this description is not intended to be construed in a limiting sense. Various modifications and combinations of the illustrative embodiments as well as other embodiments will be apparent to persons skilled in the art upon reference to the description. It is, therefore, intended that the appended claims encompass any such modifications or embodiments. This general processes and systems described herein may be modified heavily depending on a number of factors, with rearrangement and/or addition/deletion of steps anticipated by the scope of the present disclosure. Integration of this and other preferred exemplary embodiment methods in conjunction with a variety of preferred exemplary embodiment systems described herein is anticipated by the overall scope of the presently disclosed system.

Figure 1A:
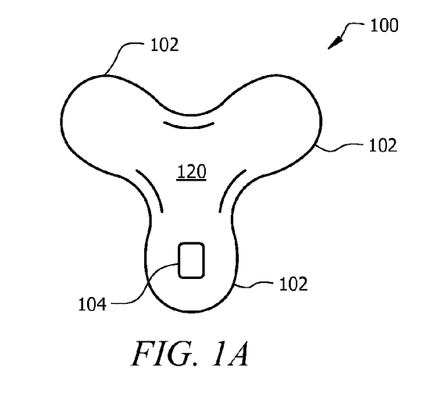
FIGS. 1A, 1B & 1C are perspective views of an embodiment of a game piece of the disclosed electronic virtual gaming system.

Within the presently disclosed system context, an exemplary embodiment of the game piece used Electronic Virtual Tabletop Sports Game System is generally illustrated in FIG. 1A. In FIG. 1A, a view of the upper side of game piece 100 is provided. The shape demonstrated in FIG. 1A is for illustrative purposes only and should not be deemed limiting. Game piece 100 includes three equally spaced spokes 102 extending from center section 120. The game piece 100 is preferably constructed of a soft, pliable polymer or fabric that provides shock absorbing properties and at the same time is of light weight construction having a boomerang style aerodynamic design that permits players to push or bump piece 100 across the table or flick the piece 100 through the air to score points according to particular game rules. Spokes 102 may be but are not necessarily constructed in a curved fashion to provide locations on piece 100 to advantageously strike the piece with the finger for a desired flight pattern.

Situated on an upper side of piece 100, as shown in FIG. 1A is button 104. Button 104 is in one embodiment a key that a user may depress or click to take certain actions with piece 100. As will be discussed below, one such action is using the piece to plot out boundaries of a playing surface for storage in an associated computer, mobile device or tablet.

Figure 1B:
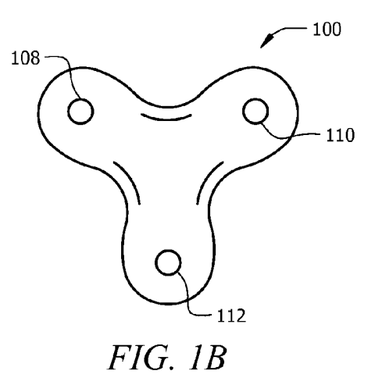

FIG. 1B depicts a bottom view of piece 100. In one embodiment, located near a distal end of each of spoke 102 is an embedded sensor device 102, such as optoelectronic sensor, which is known in the art. The optoelectronic sensor is similar to the technology employed in a common computer mouse, with the sensor acting as a small low-resolution video camera. Each sensor 102 takes successive images of the surface on which piece 100 passes. Each sensor 102 detects relative motion on a wide variety of surfaces. When, as discussed below, piece 100 is wirelessly associated with a computer, mobile device or tablet or other video device, the actual movement of piece 100 in which sensors 102 are housed is translated to a video representation of the movement of piece 100, shown according to the user's selection of a desired icon. Optoelectronic sensors can capture more than one thousand successive images or per second. Depending on the speed with which piece 100 (and the corresponding sensor 102) is moving, each image representing the location of the piece 100 will be offset from the previous one by a fraction of a pixel or as many as several pixels on the graphical user interface of the associated computer, mobile device, tablet or video monitor. The game piece 150 could be equipped with other commercially available sensors and electronics to track game piece movements, such as light emitting diodes, infrared laser diodes, or electro-mechanical movement tracking components.

Figure 1C:
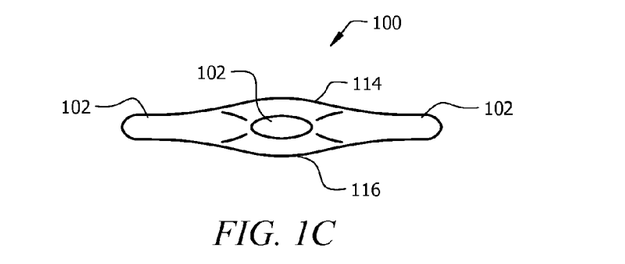

FIG. 1C depicts a side view of an embodiment of a game piece 100 employed in the present virtual gaming system. As shown in FIG. 1C, piece 100 is configured having a thickness at the upper and lower center sections 120 that is greater than the thickness of associated spokes 102. The upper surface 114 and lower surface 116 of the respective side of piece 100 cause piece 100 to remain in primary contact with the underlying game surface at the center of piece 100. As depicted, game piece 100 will also include a charging unit to recharge device batteries.

Figure 1D:
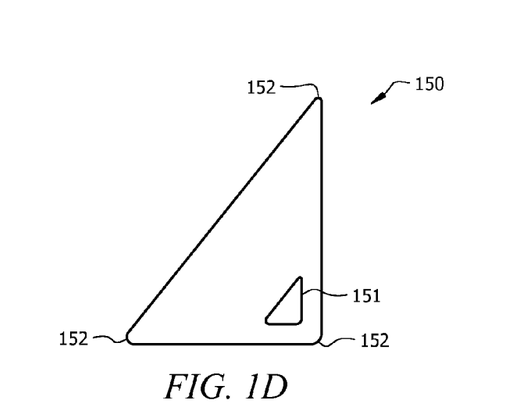
FIGS. 1D, 1E & 1F are perspective views of a second embodiment of a game piece of the disclosed electronic virtual gaming system.
Figure 1E:
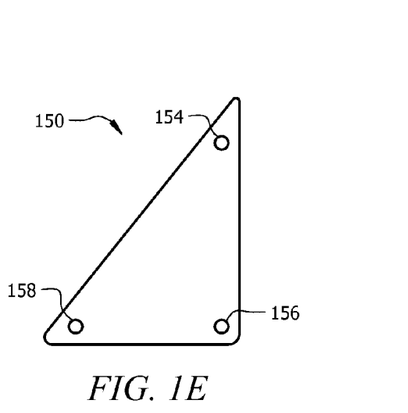
Figure 1F:
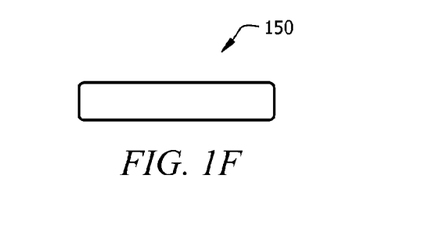

FIGS. 1D, 1E and 1F depict another embodiment of a game piece 150, which is similar to the shape of the ball used in the classic paper football game. FIG. 1D is an upper view of game piece 150. Game piece 150 includes three corners 152 and a key button 151 for activating various features of the game system.

FIG. 1E is a bottom view of game piece 150, with three sensors 154, 156 and 158 located in close proximity to the corners 152 of game piece 150 that are similar to the optoelectronic sensors described above with respect to game piece 100.

FIG. 1F depicts a side view of game piece 150, wherein the game piece 150 is largely flat.

Figure 2:
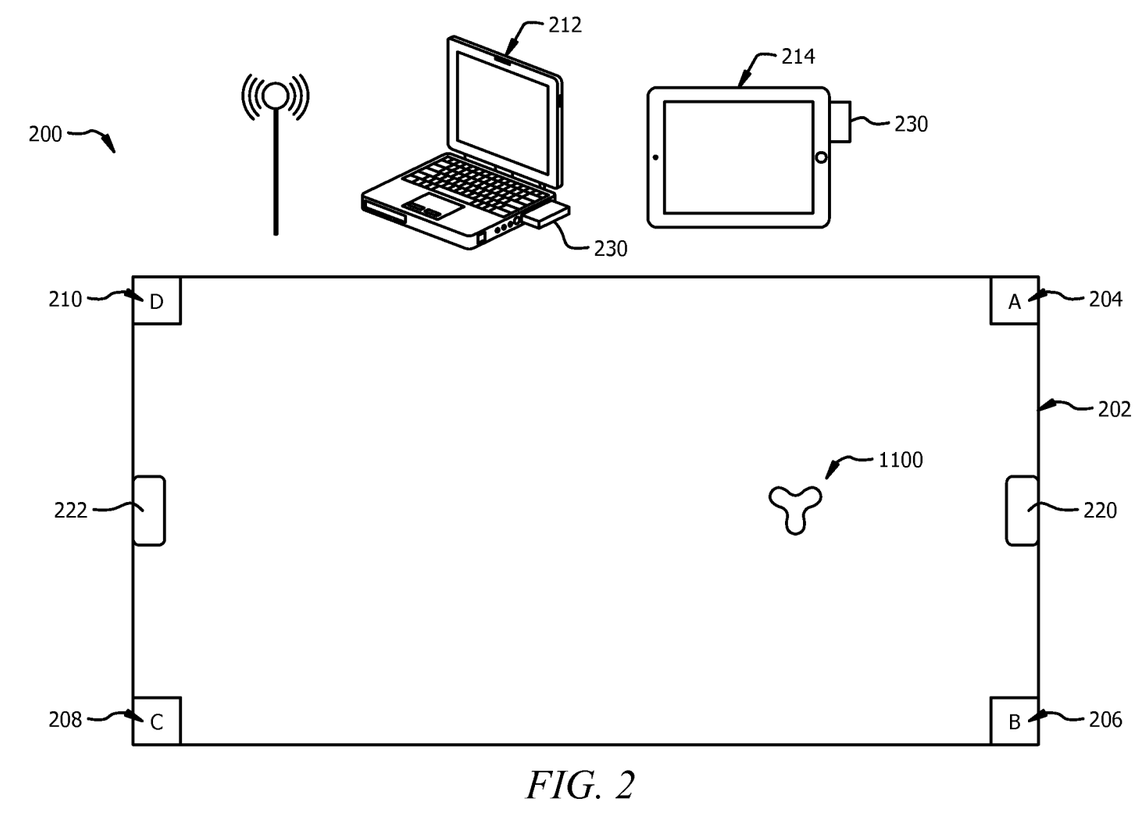
FIG. 2 is a perspective view of an embodiment of a game surface area and associated components of the disclosed electronic virtual gaming system.

FIG. 2 is a view of a table top on which the virtual electronic sports game is played. In FIG. 2, game surface 200 serves as the primary game board. Any suitable flat surface area will suffice for game surface 200, such as a countertop, dining table or even a floor. Important for successful interaction between game piece 100 and game surface 200 is that game surface 200 is largely flat. Game surface 200 as shown is an approximately rectangular surface, although any shaped surface may suffice. In FIG. 2, game surface 200 is defined by four corners: corner A 204, corner B 206, corner C 208 and corner D 210. Game piece 100 is shown on the game surface 200, where piece 100 will reside during the course of the game. Also situated at ends game surface 200 are wireless devices 220 and 222, such as smart phone or other personal digital devices that include photographic capability and a user interface. Associated in relatively close proximity to game surface 200 and game piece 100 is a device having graphic user interface and processing capability, such as a laptop computer 212 or a tablet 214. The computer or tablet is in wireless communication with game piece 100. In one embodiment the computer or tablet is in wireless communication with the game piece 100 through use of a nano-receiver 230, which is known to one skilled in the art. Nano-receiver 230 is inserted into a suitable port of a computer 212 or tablet 214 or video monitor, such as a USB port.

Game piece 100 communicates with computer 212, tablet 214 or other processing device and with smartphone or personal digital assistant devices 220 and 222 using a wireless protocol, such as Bluetooth or WiFi, or cellular. Communication functions may be facilitated through a wireless subsystem that may include RF transmitters and receivers or optical receivers and transmitters. A particular design and employment of a communication subsystem may depend on the communication networks through which game piece 100 is configured to communicate with the processing/display unit. For example, the game piece 100 may be configured to operate over a GSM, network, GPRS network, and EDGE network, a Wi-Fi network or a Bluetooth network.

Functionalities of the present virtual sports gaming system may be implemented in software or hardware or a combination of both. When features are implemented in software, this software may be installed by users via known avenues for downloading software or applications on devices such as laptop computers, tablets or smartphones. Alternatively, application software may be implemented using embedded software running on embedded processors or it may run on a specific operating system. Some or all or combinations of applications and feature sets may also be implemented in hardware or in silicon. Some functionality or feature sets may be implemented in special chip sets and may include one or more or combinations of, for example, application-specific integrated circuits (ASICs), field programmable gate arrays (FPGAs), digital signal processors (DSPs), systems on a chip, firmware, etc.

Figure 5:
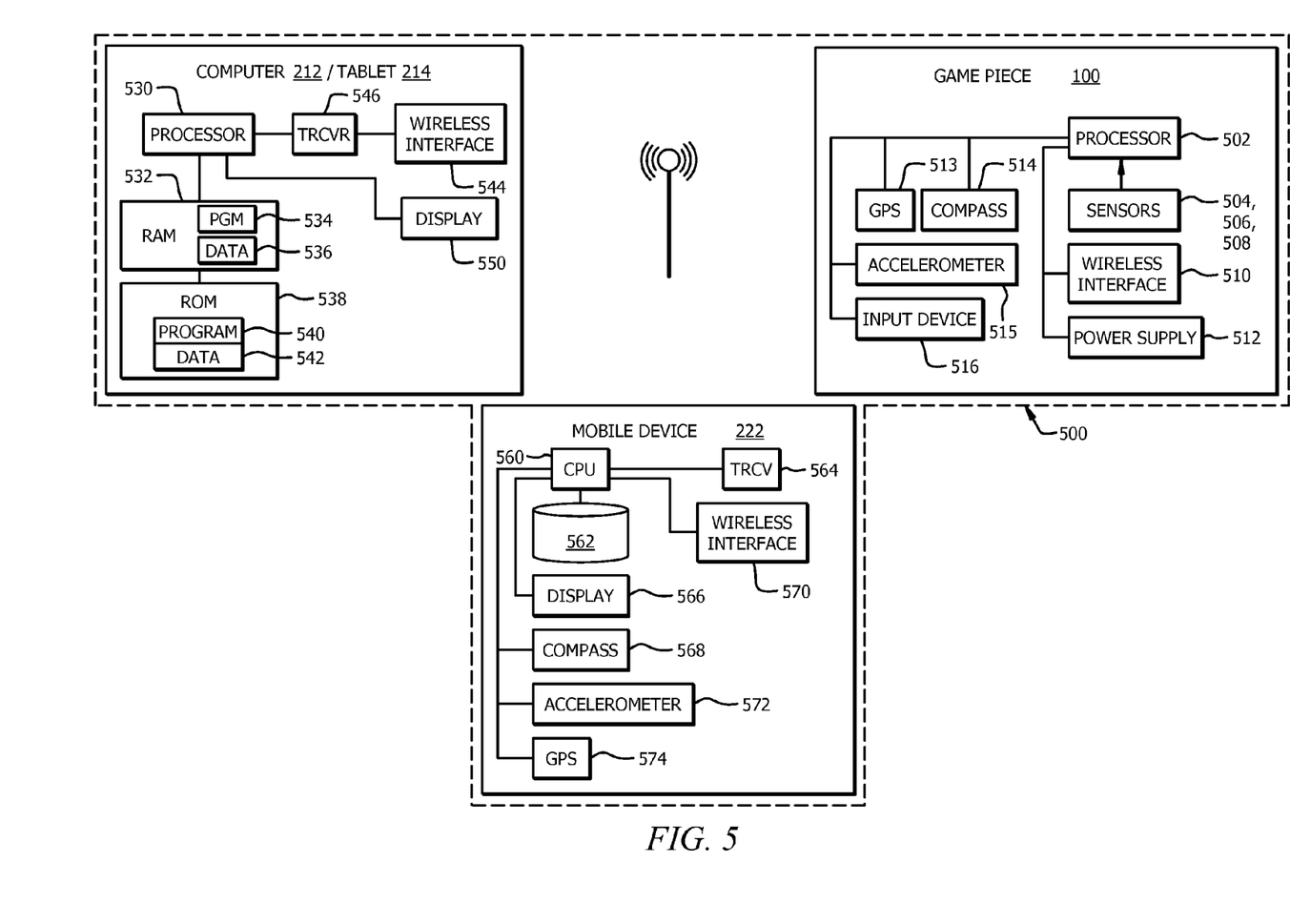
FIG. 5 is a block diagram of the various components of an embodiment of the disclosed electronic virtual gaming system.

Within the presently disclosed system context, an exemplary embodiment of the Electronic Virtual Tabletop Sports Gaming System 500 is generally illustrated in FIG. 5. In one embodiment, Sports Gaming System 500 includes three primary components, game piece 100, computer 212 and mobile device 222. As discussed, game piece 100 includes a plurality, and in this embodiment three, optoelectronic sensors 504, 506 and 508 that are embedded in game piece 100. Game piece 100 includes a processor 502 that is in communication with a storage medium that includes computer readable instructions for carrying out the functionality of the game piece. Processor 502 is also in communication with said sensors 504, 506 and 508 and controls wireless interface 510. Processor 502 also communicates with input device 516 as a result of user activation of button 104 residing on the upper surface of game piece 100. Also associated with processor 502 may be GPS components 513, an internal compass 514 and accelerometer components 515 to track game piece movement and location. One of ordinary skill in the art would appreciate the advantages and functionality of these tracking capabilities and could employ such functionality within the disclosed gaming system.

Game piece 101 communicates with computer 212 and/or mobile device 222 via a wireless communication network operating in accordance with a wireless protocol such as Bluetooth, which allows connectivity to of devices wirelessly as is known in the art, as are standard systems and protocols that permit a plurality of wirelessly enabled devices situated within a local area network ("LAN") to communicate. Computer 212 includes standard components such as processor 530, random access memory 532 and associated program storage area 534 and data storage area 536, read only memory 538 and associated program storage areas 540 and data storage areas 542. Computer 212 includes a wireless interface 544 and transceiver 546 as well as a display 550, which provides a graphical user interface for game system users.

Also in communication via a wireless protocol with game piece 100 and computer 212 is mobile device 222. In one embodiment, mobile device 222 is a smartphone. Device 222 includes a processor 560, computer readable medium or storage 562 on which various software applications reside. Also resident within mobile device 222 is a display 566, which serves as a graphical user interface of the features and functionality of the device for the user. Mobile device 222 also includes transceiver 564 and wireless interface 570. As depicted, mobile device 222 also includes digital camera capability with the display 566 depicting the camera's perspective from the viewfinder when the device 222 is in camera mode. Mobile device also includes one or more internal compasses 568, accelerometers 572 or GPS components 574 that serves as device orientation, movement and/or positioning sensors.

A user initializes game system 500 for play through interactions with game piece 100. Prior to placing game piece 100 into play, the downloading of applications through which the functionality of game system 500 is provided must be downloaded to a computer 212 or mobile device 222 or both. Once such application is installed, the wirelessly enabled game piece 100 is registered with the game system. In operation, registered game piece 100 will be recognized as the game piece associated with a particular game system. More than one game piece may be associated with a single game system. One skilled in the art will apply known techniques to register the game piece in this manner.

In operation, a user interacts with computer display 550 via game piece 100 to establish the parameters of the game. Game piece 100 and its input capability via input device 514 interacts with computer 212 using software read from a computer readable medium 562 stored in memory of game piece 100. Various operations performed by a user via the input capability of the game piece 100 cause functions to be carried out through software stored in memory of computer 212.

Figure 3:
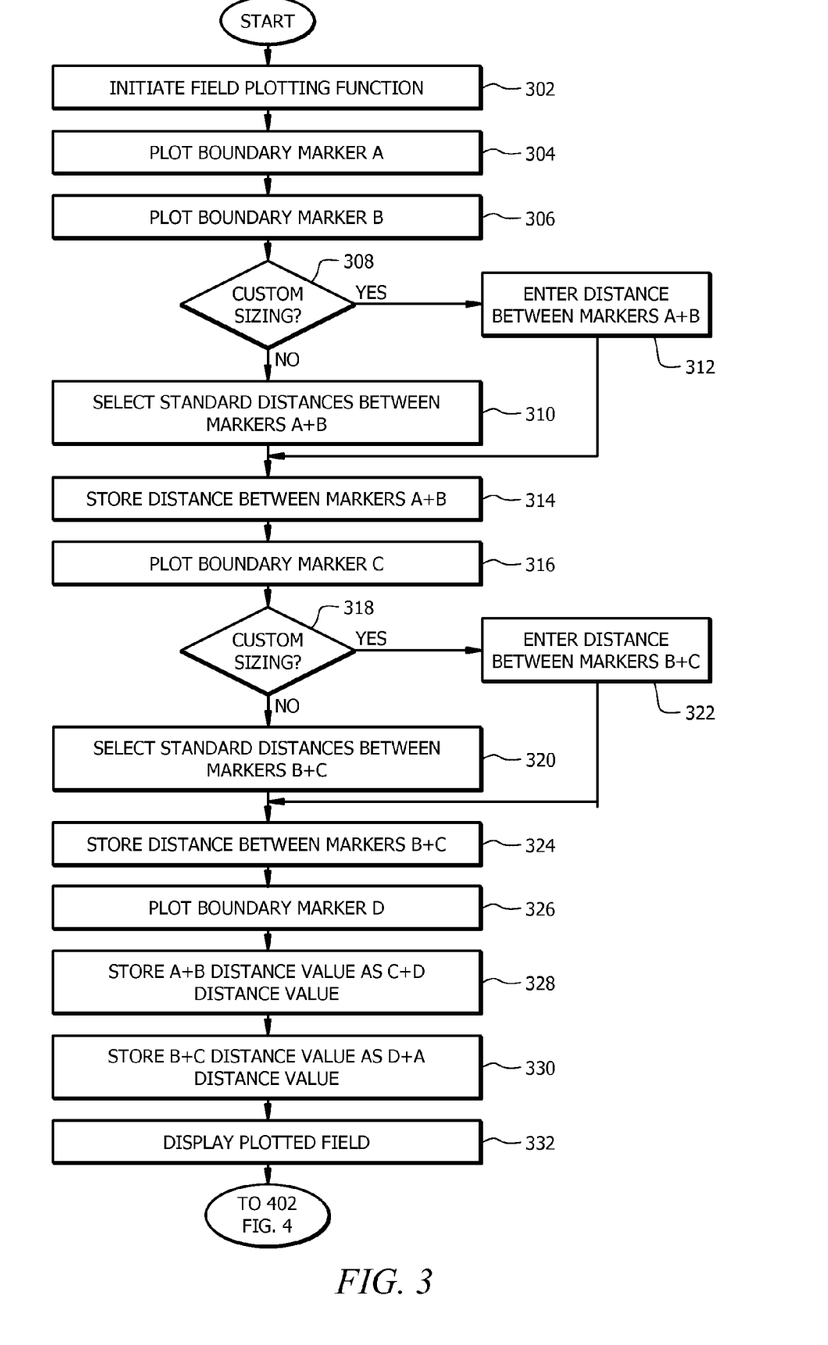
FIG. 3 is a flowchart of a game initialization process of an embodiment of the disclosed electronic virtual gaming system.

In one embodiment, an application program stored in association with processor 530 of computer 212 includes instructions that enable a user to selectively initiate the parameters of the virtual gaming system 500 in accordance with the process depicted in FIG. 3. FIG. 3 represents an exemplary process performed by the present virtual sports gaming system, through the various associated devices including game piece 100, processing and display capability of computer 212 and/or tablet 214 and/or mobile devices 220, 222. The process of FIG. 3 is as follows. In this embodiment, it is assumed that the game of choice by the user is football.

In step 302, the user initializes the field plotting function of gaming system 500. This is performed through use of the input button 104 of game piece 100 to select from a drop down menu of similar selection means presented to the user through Graphical User Interface (GUI) for the gaming system 500 via display 550 of computer 212. Once the field plotting function is selected, the process moves to step 304 in which the user then situates game piece 100 on the location of game surface 200 that is desired as corner A 204 of game surface 200, which in this example would be a corner of a football field, and depresses input button 104 on game piece 100. This operational step plots the location of the first field corner A 204 of game surface 200. During these operations, the movement of game piece 100 is tracked and visible on display 550 of computer 212. Once the user selected plotting of a football field above, the system 500 through processing capability and associated applications will understand that an approximately rectangular field will be plotted and the field will be displayed in either portrait or landscape orientation. An X-Y coordinate value representing a point on display 550 of computer 212 that corresponds to game surface 200 corner A 204 is stored and displayed. As will be discussed, landscaped orientation of the displayed field is shown in FIG. 6. It should be understood that while a generally rectangular field has been shown, such should not be deemed limiting as the field can comprise virtually any shape.

The process then proceeds to step 306 in which the user moves game piece 100 and situates it at a location in which a second corner B 206 of the game surface will be plotted in the same manner by depressing the input key 104 located on the upper surface of game piece 100. Once the key 104 is depressed at the desired location, the X-Y coordinate value representing a point on display 550 of computer 212 that corresponds to game surface 200 corner B 206 is stored and displayed.

After these first two points are plotted, the user proceeds to the point in the initialization process in which the size of the field of play on game surface 200 is designated. Although a real football field is a standard one hundred yards in length, the dimensions of the football field to be used in the present virtual gaming system may vary depending on the environmental conditions of the players. For example, a table at a well-known coffee chain may only be big enough for a field of two feet in length and one foot wide. On the other hand, a ping pong table, which is typically five feet wide and nine feet long may lend itself to a game surface. Alternatively, a table of many feet in length, but of narrow width may serve as the game surface. One such example is a shuffleboard table, which is typically 20 inches wide and up to 22 feet long. In order to set these size parameters, the initialization process of the present gaming system proceeds to step 308 at which time the user is asked if custom sizing is desired. If the answer to this query is no, then the user will be presented via the display 550 of computer 212 with a list of standard field widths, and the user will select a desired width at step 310. On the other hand, if the user desires customizable sizing, the user will be presented with a virtual tape measure capability to designate the distance between corner A 204 and corner B 206. An application program residing on mobile device 222 and/or the game piece 100, such as a smartphone provide the processing capability necessary to measure the distance between corner A 204 and corner B. If customized sizing is chosen at step 308, the user is presented with a list of common items that will serve as a reference for measuring. One such item is an automated teller machine (ATM) card, which is of an industry standard width and length. Alternatively, any common personal item may be used, such as a standard half liter disposable water bottle, a standard sized ball point pen, a stick of lip gloss, or any other common item. In this embodiment, if the ATM card is chosen, the user places the card lengthwise along a line between previously plotted corner A 204 and corner B 206. The user then places two items on plotted corner A 204 and corner B 206. Virtually any items will suffice, such as the game piece 100 and a coffee cup. Next, using smartphone 222 or a digital camera, the user activates an accessory application residing in memory of the smartphone 222 to measure the distance. Once the user selects "customized sizing" mode and further selects "ATM card" when asked to select the reference item, the user photographs the aligned ATM card between the two items placed at the plotted corners. The predictive measuring algorithm residing in memory 562 of smartphone 222 of game system 500 will determine the distance between corner A 204 and corner B 206 by knowing the standard length of the ATM card and its relation to the objects placed on two corner points. This distance is presented to the user through the display 566 of the smartphone 222 and at step 312, the user may enter the value as the measurement between corner A 204 and corner B 206 through activation of the key button 104 on game piece 100 or through a keyboard associated with computer 212.

Game piece 100 and mobile device or smartphones 220 and 222 may be equipped with components known it the art such as compass capability and accelerometers to measure direction and movement distance. These devices along with laptop 212 or tablet 214 may be equipped with Global Positioning System (GPS) capability that allows for measurement between points, game piece movement tracking and field size. One of ordinary skill in the art will appreciate and recognize the availability of these capabilities and incorporate these capabilities into the disclosed gaming system.

Once a standard or customized value for the distance between corner A 204 and corner B 206 is selected, which corresponds to the width of the playing field, the process continues at step 314 where said value is stored in non-volatile memory 538 of computer 212.

Next, the game initialization process of FIG. 3 continues with the plotting of corner C 208 at step 316 in similar fashion as prior corners were plotted. In this example of plotting a football field as game surface 200, corner B 206 and corner C 208 form one sideline of the field. After the corner C location is selected via key button 104 on game piece 100 as described above with respect to the previously plotted corners, the method proceeds to step 318 where again the user is asked is standard or customizable sizing is desired. If standard sizing is chosen, the user is presented via display 550 of computer 212 with a list of standard field lengths, from which the user at step 320 may select using the computer keyboard or the selection key button 104 of game piece 100. Alternatively, if the user selects customizable sizing, at step 322 the user repeats the virtual measuring process described above again using one of a variety of common reference items, such as an ATM card. Once the user is presented with the distance via the smartphone 222 game system 500 associated application residing on smartphone 222, the user at step 324 stores the value of the distance between corner B 206 and corner C 208 in memory 538 of computer 212.

Other applications may be downloaded to a smartphone to facilitate measurements, such virtual tape measuring applications, are commercially available and known in the art.

Alternatively, the game boundaries may be plotted by game system 500 displaying a rectangular field on display 550 during field plotting having a center point shown. The user, using the game piece 100, situates the physical game piece 100 at the center of game surface 200 and locates the game piece icon appearing on display 550 on the center point of the field shown on the screen. Next, with the key button 104 depressed, the user drags game piece 100 from the center point of game surface 200 to the corner point A 204. Release of key button 104 sets the actual distance between the center point of game surface 200 and corner A 220. These steps may be repeated for corners B and C. Once these sides of the field are set, and the values are stored in memory 538, the field is plotted. This plotting application may as easily be performed by the smartphone 222 equipped with an appropriate application program for performing the dragging and plotting function.

Alternatively, smartphone 222 equipped with the appropriate tape measuring application may be used to measure and plot the boundaries of game surface 200.

The user may place removable stickers or decals denoting the corners of the game surface or boundary lines. Alternatively, the user may place common items such as a red Solo brand cup as a pylon that also serves for convenient access to a favorite beverage.

The process then proceeds to step 326 where the location of corner D 210 is plotted in similar fashion as described above. At this juncture, however, no further measurement is required. Instead, since a football field was selected as the game surface of choice, the field is a rectangle. As such, the distance between corner A 204 and corner B 206, at this point established, is the same as the distance between corner C 208 and corner D 210. Accordingly, the value stored for the distance between corners A and B are stored as the distance between corners C and D at step 328. Similarly, since the distance between corners B and C (the sideline) is known, this distance is stored as the distance between corners D and A (the opposite sideline) at step 330.

Figure 4:
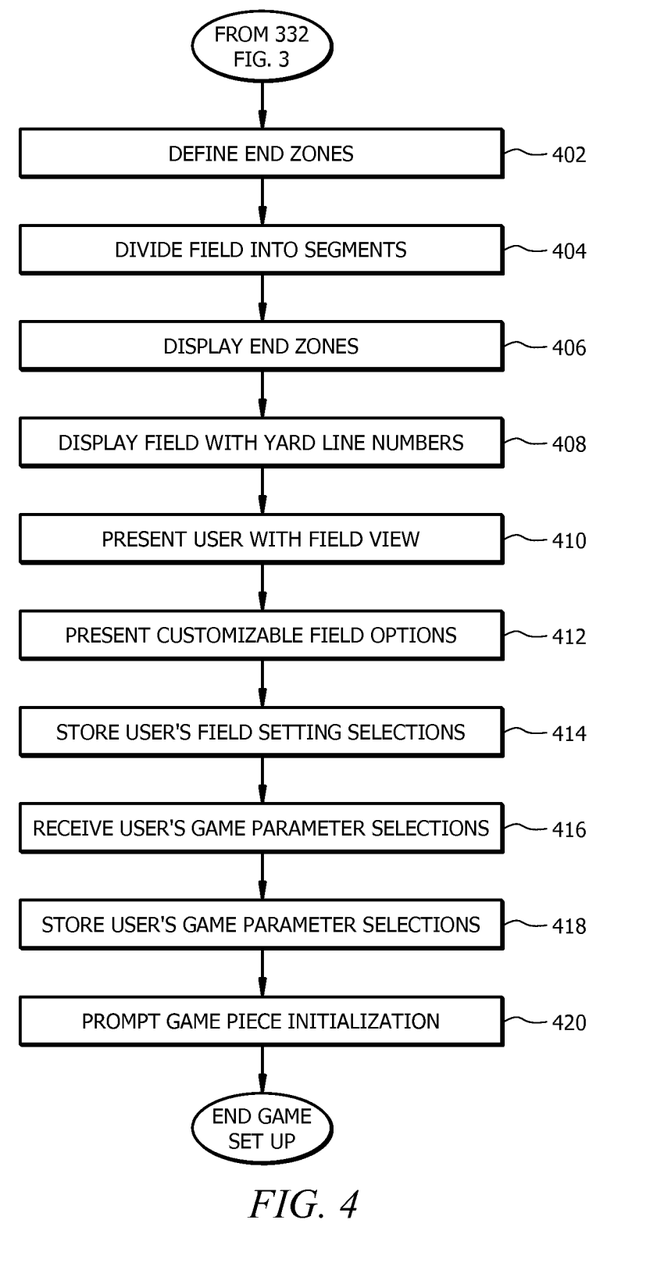
FIG. 4 is a flowchart of a game set up process of an embodiment of the disclosed electronic virtual gaming system.

FIG. 4 depicts the steps in the process of displaying the plotted game area to the user via the display of a computer 212 or smartphone 222. Once the actual parameters of the field are established as described with reference to the process shown in FIG. 3, the game set up process proceeds to step 402, where end zones are designated by system 500 through processor 530 executing program instructions stored in ROM 538. A football field is one hundred and twenty yards in length, with one hundred yards for the field of play and twenty yards dedicated to two ten yard end zones at each end of the field. According, once the field is plotted, game system 500 will divide the field of play into twelve equal segments representing ten yard segments in the field of play at step 404. Next, at step 406, the system displays the end zones, and at step 408 displays the field with yard lines across the field, denoted by the actual yard line number (i.e., 10, 20, 30, etc.). At the completion of step 408, the user will be presented at step 410 with an overhead view of a classic football field as seen in FIG. 6.

In another embodiment, a narrower endzone in relation to the yardage of the field may be designated to offer players a greater challenge. Depending on the size of the game surface, the user may designate the endzone to be only a small percentage greater in depth than the diameter or longest side of game piece 100. This feature accounts for longer tables where ten yards of virtual field may translate into one foot of table depth, making scoring quite easy. The software of game system 500 will permit customizable sizing of the endzone depending on player skill and desired level of challenge.

Once the field is displayed, the user is presented with various options for customizable field settings at step 412. These customizable options include selection of professional, college of high school team names, colors or logos for end zones, at midfield or on other parts of the screen. The user may also select various field turf colors and score board configuration. Once the user selects the desired look of the field, scoreboard, etc., the user's options of field settings are stored in memory 538 at step 414. At this stage, the plotting settings described in FIG. 3 and the field settings discussed with respect to FIG. 4 may be collectively stored as a field/location file for later use. For example, if the field plotting is customized for play at the local café and the teams are Green Bay and Chicago, the user may designate the file with filename "Green Bay—Chicago Coffee Shop". In this way, these settings may be retrieved for later play at the same location without repeating the process of plotting the customized field.

The process of FIG. 4 continues at step 416 where the user sets the game parameters. These features include the length of time of game quarters and field goal opportunity zones. The user may also designate the maximum amount of time a user may allow to elapse before starting a play. Alternatively, a set period may elapse with each play, regardless of the time taken for the actual play. In other words, each play may result in a 40 second run-off regardless of actual play time.

The user may also designate the number of bumps of the game piece a player may take in a possession. A user may only have a single bump or multiple bumps or pushes of the game piece per possession.

With respect to field goals, the user may designate a yardage zone, for example, between the opponent's 20 and 30 yard lines. When a player bumps the game piece 100 in a manner in which all three sensors 108, 110 and 112 come to rest within the designated yard lines, that player may attempt a field goal. Other parameters such as number of time outs may also be set. These game parameters are stored at step 418.

Finally, prior to the start of play, the game piece 100 will be initialized for play at step 420. The game piece initialization may be a series of depressions of key button 104 or selection of a "begin game" icon or tab on computer 212 display screen 550. This operation will cause the next movements of game piece 100 across game surface 200 to be tracked on display 550 and recorded.

Once the actual game surface size is established, a visual representation of the game surface 200 is displayed to the user on display 550 of computer 212 or alternatively on the display 566 of mobile device 222. An embodiment of the displayed representation of game surface 200 is depicted in FIG. 6. In FIG. 6, a graphical display 600 of the virtual game surface of the present disclosure is shown. Within graphical display 600, virtual field 602 is shown, which represents a traditional football field. Virtual field 602 is presented as a 120 yard field, with two end zones 606 and 608 represented as ten yards in width and a one hundred yard playing area 604. Playing area 604 is divided into ten, ten yard sections. Yard line markers, such as 610 which is the thirty yard line, are also displayed.

FIG. 6 also depicts scoreboard 620. Scoreboard 620 includes fields for visiting team score 622, home team score 624, game quarter 625, time remaining in a quarter 626, home team time outs remaining 628, visiting team time outs remaining 630. The scoreboard of FIG. 6 also presents "Field Goal" key 632 and "Time Out" key 634. During game play, the user may traverse actual game piece 100 across game surface to move game piece icon 650 over the field goal key 632 or time out key 634 to either kick a field goal or call a time out. Selection of one of these keys is made by depressing the key button 104 on the upper side of game piece 100 when the icon 650 is situated over the desired key. If the player is not eligible to kick a field goal or if the player has no time outs remaining, the relevant key may not be activated. The virtual field 602 and scoreboard 625 may be customized as described above with respect to FIG. 4 to give users a desired look and feel.

Figure 7:
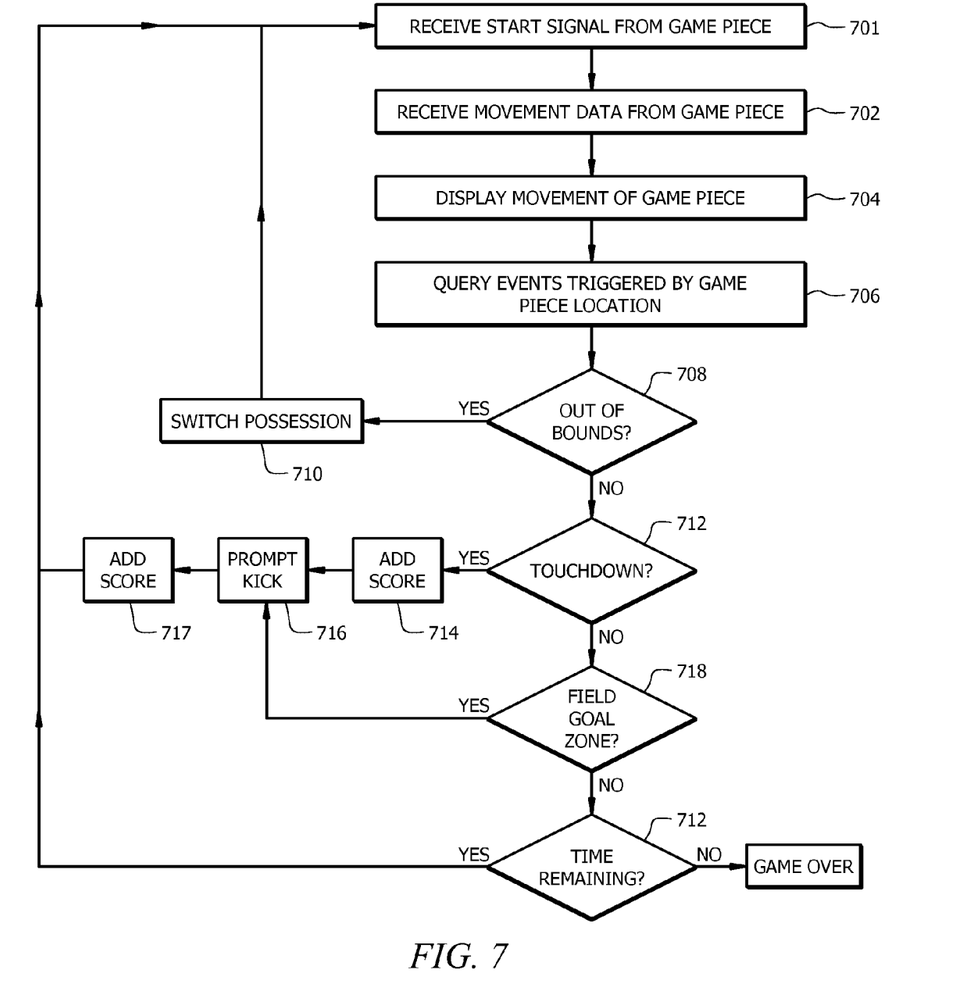
FIG. 7 is a flowchart of the various steps performed by the game system host in one embodiment.

Various steps performed by the game system host in one embodiment of the disclosed virtual gaming system during game play, whether hosted by computer 212, tablet 214 or mobile device 222 are shown with reference to FIG. 7. In this example, computer 212 is the game host. Game play starts after game parameter and set up is completed, as described with reference to FIGS. 3 and 4. At the start of play of the described football game, one team has possession of the ball first. Various methods may be used to determine who starts the game with possession, such as a coin toss or a single push of game piece 100 by each player to determine which player can push game piece 100 closest to the end of game surface 200 without allowing game piece 100 to fall off of the game surface 200. The game play process starts with step 701 where a user depresses key button 104 of game piece 100 to begin that user's possession. In this embodiment, a single bump of push of the game piece 100 per possession applies. Following this action, a player tries to score by pushing or bumping the physical game piece 100 across game surface 200, computer 212 receives movement data from game piece 100. This occurs by virtue of sensors 108, 110 and 112 of game piece 100 detecting sensing movement of game piece according to operation of optoelectronic sensors housed within game piece 100, as would be understood by one of ordinary skill in the art. Through the wireless connectivity of game piece 100 and computer 212, game piece 100 sends movement data of game piece 100 to computer 212. In response to this receipt of data, computer 212 through execution of game system applications programs, displays the game piece movement on display 550 at step 704. This receipt and display of movement data occurs in real-time. Visually, in one embodiment, a twenty to thirty yard strip of the video image of the field on display 550 scrolls as the icon of game piece 100 travels across the yard lines.

At step 706, the host system queries whether an event is triggered by the location of game piece 100 on game surface 200 at step 706. The first query at step 708 is whether the game piece came to rest outside of the plotted boundaries of game surface 200. If the answer to this query is "yes", then the process proceeds to step 710 where possession of the game piece is switched, the process returns to step 701 where the other player depresses key button 104 to start his possession.

If, on the other hand, the answer to the query at step 708 is "no", then a second query at step 712 of whether a touchdown was scored is presented. A touchdown, in one embodiment, is scored if the game piece comes to rest with at least one of the three sensors 108, 110 or 112 of game piece 100 in the opponent's end zone with no sensor coming to rest outside of the sides or back of the end zone. If the result of the play is a touchdown, then six points are added to the scoring team's score and kicking mode is prompted at step 716. The manner in which an extra point mode occurs is described below. If the kick is successful, the score is updated at step 717, and the process returns to step 702 with the other player taking over possession.

If, on the other hand, the play does not result in a touchdown, the process proceeds to step 718 and the query is presented of whether the game piece 100 came to rest in the field goal zone. A player is eligible to attempt a field goal if the game piece 100 comes to rest within the pre-set field goal zone. This is determined if one, two or three of the sensors of game piece 100 comes to rest in the field goal zone. If game piece 100 does come to rest in the field goal zone, the process returns to step 716 and the field goal attempt function is prompted.

A player may attempt a field goal or extra point in various ways. As was the case with the traditional game, the kicking team may simply turn game piece 100 on its edge and flick the piece through the air with the finger. Game piece 100 is constructed of lightweight, spongy material that prevents damage to internal components but is lightweight to promote easy sliding and flight. The opposing player may either construct a "human field goal post" with fingers and thumbs. In this case, the kicking player must kick or flick the game piece from one end of the table through the uprights at the opposite end of the table in order to succeed on the attempt. For an extra point, one point is awarded and for a field goal, three points are awarded. Once game system 500 enters field goal or extra point mode, a window will appear on display 550, asking whether the attempt was good or not. If yes, the user clicks the icon representing the game piece on the display via game piece 100 key button 104 to select yes, and the appropriate amount of points will be added to the player's score at step 717, then the process returns to step 710 for change possession and the process returns to step 702. If the kick fails, no points are awarded. After the kick, possession changes and the process of FIG. 7 returns to step 702 for a new possession.

Field goals and extra points may also be attempted with use of a mobile device or smartphone 222 in lieu of a human goal post. This may be achieved through the video camera or digital camera capability available in most smartphones. In field goal mode, the non-kicking player may set a smart phone at his end of the table and turn on video camera recording. The positioning of the smartphone 220 or 222 for kicking mode is shown in FIG. 2.

Next, the kicking player attempts the kick in ordinary fashion as described above. Once the kick is complete, failure may be obvious, in which case no points are awarded as described above. For closer attempts, however, the non-kicker may simply turn off recording after the kick and review the video. If the game piece 100 is caught on video by the camera, the kick is good and the appropriate points are tallied.

In an alternative kicking method, smartphone 222 may be equipped with motion sensing capability, in which motion passing at or near an optical sensor situated on the device is detected. In this or in the case of video recording operation, the smartphone may be in communication with computer 212 to transmit a message that the kick was successful or not, and game system 500 will tally the score without user intervention. One of ordinary skill in the art will be able to incorporate motion sensor technology into the game system via a smartphone application.

In yet another embodiment, the smartphone or mobile device 222 may have installed an associated game system 500 application, downloadable as is typical mobile device applications. This application will automatically place smartphone 222 in field goal sensing mode when the player is eligible to kick a field goal or extra point. Once the smartphone is in field goal mode, the camera is placed with display facing upward as described. As is known, in camera mode of a smartphone, the screen displays what is in the path of the lens. In field goal mode, the camera will sense a change in state of pixels that will occur if the game piece 100 passes over the lens. If the smartphone so senses a change in pixel state, then the game system indicates that the kick was successful and points are awarded accordingly. If the kick is missed, no points are awarded.

Optionally, the smartphone screen may present a video image of the top of the goal posts or other angle of the goalposts prior to the kick. The game system 500 on screen 550 may also retrieve and play appropriate footage from memory 538 after the kick, depending on the result. For example, a video clip of a referee indicating that the kick is good or missed is played.

Alternatively, game piece 100 may be equipped with an RFID tag and smartphone 222 may be equipped with RFID reader capability. In this embodiment, the smartphone 222 RFID sensor will be triggered when game piece 100 traverses the phone.

The process of FIG. 7 continues at step 720, where the game system time clock is queried to determine if there is time left in the game. When no game time remains after four quarters, the game ends. If game time remains, the process returns to step 702.

In connection with any of the game events described above, in another embodiment of the virtual gaming system, various audio and video files may be played as a result of various plays. Audio of crowd noise, fights songs, play-by-play commentary and the like may be stored in ROM 538 of computer 212 or tablet 214 or in storage 562 of mobile device 222. Video clips of favorite players, famous plays or ball flight may be stored in a similar manner. In response to various game events, audio or video files may be played and sensed by the user through audio and video capability of the host device.

Figure 8:
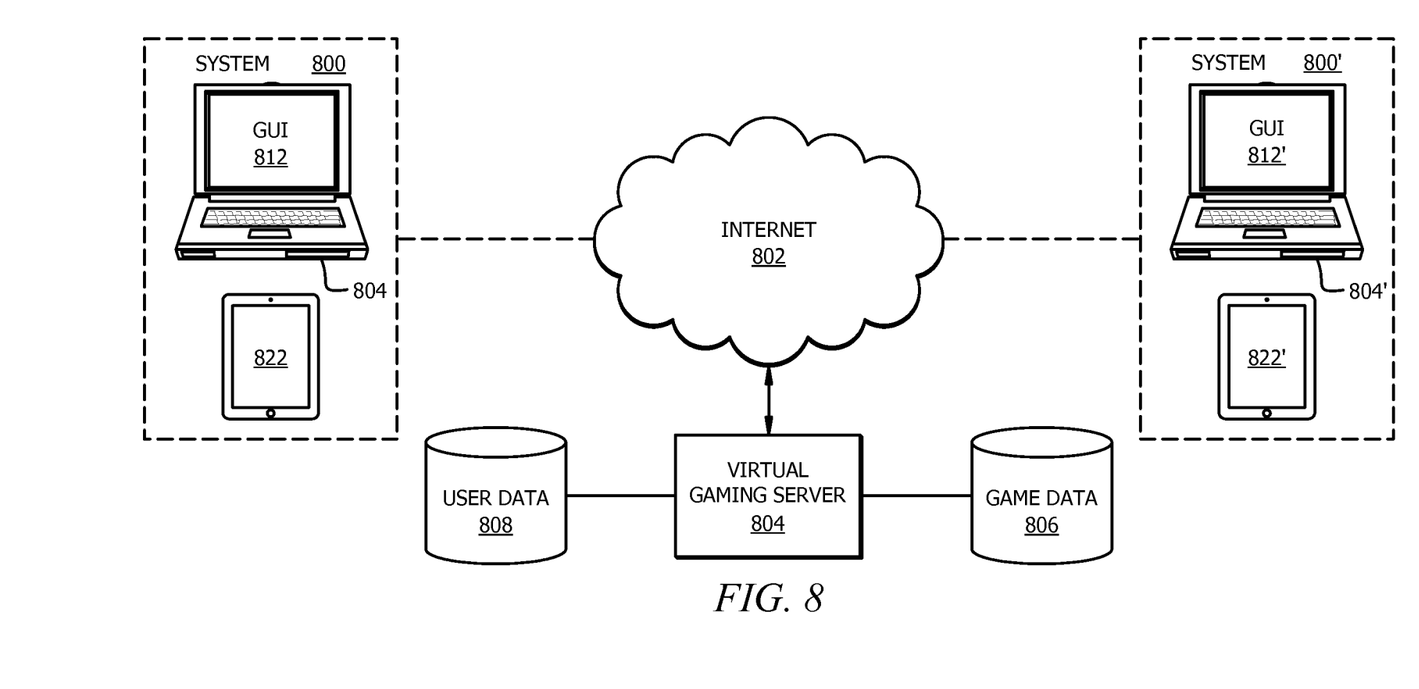
FIG. 8 is a flowchart of the network architecture and components through which play between remotely located players can be achieved in one embodiment.
Figure 9:
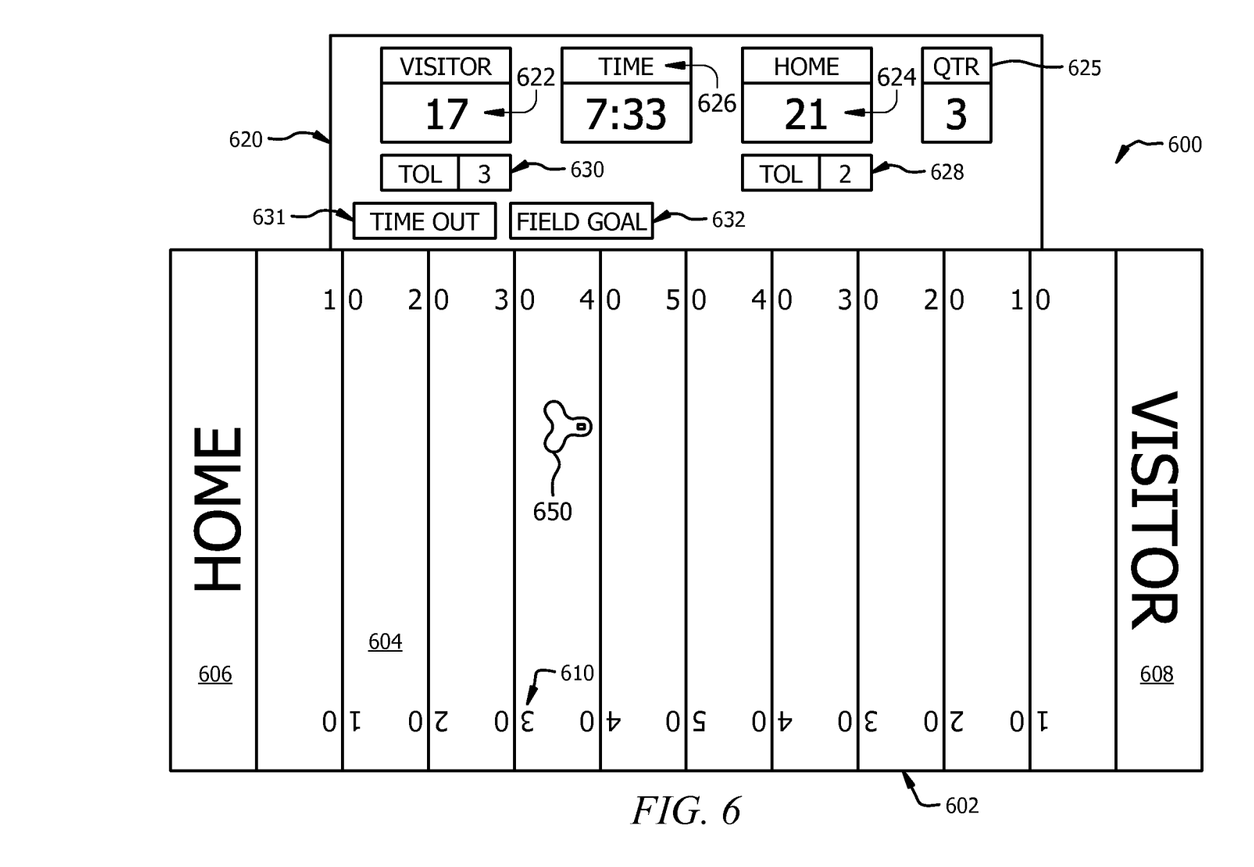

In another embodiment of the described virtual sports gaming system, players may play from remote locations. FIG. 8 depicts the network architecture and components through which play between remotely located players may be achieved. FIG. 8 shows two game systems 800 and 800'. Each system is equipped with components discussed with reference to FIG. 5, such as computers 804 and 804' corresponding graphical user interfaces (GUIs) 812 and 812' as well as smartphones or similar mobile devices 822 and 822'. Each system is in communication with a virtual gaming server 804 over the Internet 802 via a website that is provided to the user via a web browser. Virtual gaming server has associated databases 806 and 808 in which game data and user data is stored, respectively.

Once the user of systems 800 and 800' enters the website, the user is presented with a webpage on the respective GUI 812 or 812' through which the user may enroll for remote playing capability. In this manner, two players, each having a game piece 100 may plot a field as described above with reference to FIG. 3 and proceed with playing the game as would two people sitting across from the same table. In the remote context, however, game events are presented to the user in real time via the user's web browser presented on GUI 812 and 812'.

In addition, once a user registers on the virtual gaming website, whether the player plays locally or remotely, the player may register a team and create leagues of several teams formed by other players who may be local or remote. The user registering for the website will have unique credentials that are securely stored in user data database 808 while game and league results and statistics are stored in game data database 806.

In another embodiment of the disclosed virtual gaming system, the game surface 200 described in FIG. 2 and the display capability depicted in FIG. 6 that is facilitated through computer 212, tablet 214 or smartphone 222 may be combined in a tabletop display unit. Commercially available software such as Microsoft PixelSense may be employed to provide an interactive surface computing platform through which game actions and functionality may be achieved through the platforms object recognition capabilities.

As generally illustrated herein, the system embodiments of the present disclosure can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. The present disclosure includes this type of computer readable media within its scope. The presently disclosed system anticipates a wide variety of variations in the basic theme of construction. The examples presented previously do not represent the entire scope of possible usages. They are meant to cite a few of the almost limitless possibilities. One skilled in the art will recognize that other embodiments are possible based on combinations of elements taught within the above description.

Although a preferred embodiments of the present disclosure have been illustrated in the accompanying drawings and described in the foregoing Detailed Description, it will be understood that the present gaming system is not limited to the embodiments disclosed, but is capable of numerous rearrangements, modifications, and substitutions without departing from the spirit of the system as set forth and defined by the following claims.

ADDITIONAL DISCLOSURE

Clause 1. A gaming system, comprising:
a game surface having multiple boundary points defining an area of play;
a game token having at least one sensor for tracking position relative to a game surface;
a wireless interface component associated with the game token;
a remote processor for receiving over the wireless communication network from the game token game surface boundary points and game token movement data;
a display associated with the remote processor;
an application program executable to display movement of the game token on the display; and
a multimedia file that is retrievable by the processor in response to the game token movement data.

Clause 2. The gaming system of any preceding or following clause wherein said game token comprises three spaced spokes extending from a center section.

Clause 3. The gaming system of any preceding or following clause wherein said game token comprises an optoelectronic sensor.

Clause 4. The gaming system of any preceding or following clause comprising a first gaming system and a second gaming system, wherein said first gaming system is connected via the Internet to the second gaming system such that a first user of said first gaming system can compete against a second user on said second gaming system.

Clause 5. The gaming system of any preceding or following clause wherein said first gaming system and said second gaming system are in different locations.

Clause 6. The gaming system of any preceding or following clause wherein said game token comprises a feature selected from the group consisting of: compass, accelerometer, GPS component, movement sensor, positioning sensor.

Clause 7. The gaming system of any preceding or following clause wherein said area of play comprises a rectangle.

Clause 8. The gaming system of any preceding or following clause wherein said game token comprises a soft outer texture, wherein said texture is suitable for flicking.

Clause 9. The gaming system of any preceding or following clause wherein said area of play comprises four corners.

Clause 10. The gaming system of any preceding or following clause wherein said display displays a representation of said area of play.

Clause 11. The gaming system of any preceding or following clause wherein said display further displays a score of at least one player.

Clause 12. The gaming system of any preceding or following clause wherein said representation of said area of play resembles a football field.

Clause 13. The gaming system of any preceding or following clause wherein said football field is divided into twelve segments.

Clause 14. A gaming system, comprising:
a game surface;
a game token having an upper surface, a lower surface and a plurality of lobes extending from a hub;
a movement tracking sensor embedded on the lower surface of the game token at a distal end of each lobe;
an activation key located on the upper surface of the game token;
a mobile device in communication with the game token over a wireless communication network;
a data storage area associated with the mobile device in which data associated with said game system is stored;
a display screen associated with the mobile device;
an application program associated with the mobile device executable to display game token movement; and
an application program executable to play a multimedia file in response to game token movement.

Clause 15. The gaming system of any preceding or following clause wherein said mobile device comprises a feature selected from the group consisting of: compass, accelerometer, GPS component, movement sensor, positioning sensor.

Clause 16. The gaming system of any preceding or following clause wherein said mobile device comprises a smart phone and wherein an image capturing capability of said smart phone detects game token flight.

Clause 17. A game system, comprising:
a game surface having multiple boundary points defining an area of play;

a game token having at least one sensor for tracking position relative to a game surface;
a wireless interface component associated with the game token;
a remote processor for receiving over the wireless communication network from the game token game surface boundary points and game token movement data;
a display associated with the remote processor; and
an application program executable to display movement of the game token on the display.

Clause 18. The game system of any preceding or following clause further comprising a multimedia file that is retrievable by the processor in response to the game token movement data.

Clause 19. The game system of any preceding or following clause wherein said multimedia file comprises celebratory audio when a point is scored.

Clause 20. The gaming system of any preceding or following clause wherein said display displays a representation of said area of play, wherein said display displays the position of the game token on said area of play.

What is claimed is:

1. A gaming system configured to play a tabletop football game, the gaming system comprising:
    a physical game surface having a plurality of boundary points defining an area of play;
    a triangular game token having a plurality of sensors, the plurality of sensors located at distal ends of each of three triangular game token points, which are configured to:
        (i) track a position of the triangular game token relative to the physical game surface when the triangular game token is physically pushed across the physical game surface; and
        (ii) provide an indication of a game scoring event when at least one of the three triangular game token points comes to rest over an edge of the physical game surface;
    a wireless communication network associated with the triangular game token;
    a display device remote from the physical game surface configured to display representations of game token location data, the game token location data based on the plurality of sensors tracking the position of the triangular game token relative to the physical game surface;
    a non-transitory memory device configured to store thereon a game application program and a multimedia file that is retrievable in response to the game scoring event based on the game token location data; and
    a remote processor configured to:
        (i) receive, over the wireless communication network from the triangular game token, the game token location data that is at least relevant to the game scoring event and the indication;
        (ii) in response to receiving the indication, retrieve, from the non-transitory memory device, the multimedia file; and
        (iii) execute the game application program to display, on the display device, the representations of the game token location data including movement of the triangular game token across the physical game surface using the multimedia file.

2. The gaming system of claim 1 wherein said triangular game token comprises an optoelectronic sensor.

3. The gaming system of claim 1 comprising a first gaming system and a second gaming system, wherein said first gaming system is connected via the Internet to the second gaming system such that a first user of said first gaming system can compete against a second user on said second gaming system.

4. The gaming system of claim 3 wherein said first gaming system and said second gaming system are in different locations.

5. The gaming system of claim 1 wherein at least one of said plurality of sensors is selected from the group consisting of: compass, accelerometer, GPS component, movement sensor, and positioning sensor.

6. The gaming system of claim 1 wherein said triangular game token comprises an infrared light emitting diode.

7. The gaming system of claim 1 wherein said triangular game token comprises a soft outer cover having a tapered edge suitable for airborne movement off of the game surface and towards a goal post by flicking.

8. The gaming system of claim 1 wherein said area of play comprises four corners.

9. The gaming system of claim 1 wherein said display device displays a representation of said area of play.

10. The gaming system of claim 9 wherein said display device further displays a score of at least one player.

11. The gaming system of claim 9 wherein said representation of said area of play resembles a football field.

12. The gaming system of claim 11 wherein said football field is divided into twelve segments.

13. A gaming system configured to play a tabletop sports game, the gaming system comprising:
    a physical game surface;
    a game token having a plurality of lobes extending from a hub and having a plurality of sensors, the plurality of sensors located at a distal end of each of three lobes, which are configured to:
        (i) track a position of the game token relative to the physical game surface when the game token is physically pushed across the physical game surface; and
        (ii) provide an indication of a game scoring event when at least one of the three game lobes comes to rest over an edge of the physical game surface;
    a wireless communication network associated with the game token; and
    a mobile device in communication with the game token comprising:
        a display device configured to display representations of game token location data, the game token location data based on the plurality of sensors tracking the position of the game token relative to the physical game surface;
        a non-transitory memory device configured to store thereon a game application program and a multimedia file that is retrievable in response to the game scoring event based on the game token location data; and
        a processor configured to:
            (i) receive, over the wireless communication network from the game token, the game token location data that is at least relevant to the game scoring event and the indication;
            (ii) in response to receiving the indication, retrieve, from the non-transitory memory device, the multimedia file; and
            (iii) execute the game application program to display, on the display device, the representations of the game token location data including movement of the game token across the physical game surface using the multimedia file.

14. The gaming system of claim 13 wherein said mobile device comprises a position detecting capability selected from the group consisting of: compass, accelerometer, GPS component, movement sensor, and positioning sensor.

15. The gaming system of claim 13 wherein said mobile device is a smart phone and said non-transitory memory device is configured to store an associated application program, which when executed by the processor, causes the smart phone to: (i) detect game token flight, (ii) display on said display device an image of a game token target area, and (iii) display on said display device an image of a game status according to the smart phone detection of game token passage within the game token target area.

16. A gaming system configured to play a tabletop sports game, the gaming system comprising:
 a physical game surface having multiple boundary points defining an area of play;
 a game token having at least one sensor located at an exterior edge of a lower side of the game token, configured to:
  (i) track a position of the game token relative to the physical game surface when the game token is physically pushed across the physical game surface; and
  (ii) provide an indication of a game scoring event when the least a portion of the game token comes to rest over an edge of the physical game surface;
 a wireless communication network associated with the game token;
 a display device remote from the physical game surface configured to display representations of game token location data, the game token location data based on the at least one sensor tracking the position of the game token relative to the physical game surface;
 a non-transitory memory device configured to store thereon a game application program and a multimedia file that is retrievable in response to the game scoring event based on the game token location data; and
 a processor configured to:
  (i) receive, over the wireless communication network from the game token, the game token location data that is at least relevant to the game scoring event and the indication;
  (ii) in response to receiving the indication, retrieve, from the non-transitory memory device, the multimedia file; and
  (iii) execute the game application program to display, on the display device, the representations of the game token location data including movement of the game token across the physical game surface using the multimedia file.

17. The game system of claim 16 wherein said multimedia file comprises celebratory audio when a point is scored.

18. The gaming system of claim 16 wherein said display device displays a representation of said area of play, wherein said display device displays the position of the game token on said representation of said area of play.

19. The game system of claim 16 wherein said game token comprises a soft outer cover having a tapered edge suitable for airborne movement off of the game surface and towards a goal post by flicking.

20. The gaming system of claim 16 wherein said non-transitory memory device is configured to store an associated application program, which when executed by the processor, causes a mobile device to: (i) detect game token flight, (ii) display an image of a game token target area, and (iii) display an image of a game status according to the mobile device detection of game token passage within the game token target area.

* * * * *